US008517053B2

(12) United States Patent
Henry et al.

(10) Patent No.: US 8,517,053 B2
(45) Date of Patent: Aug. 27, 2013

(54) CARTRIDGE TYPE VORTEX SUPPRESSION DEVICE

(75) Inventors: Robert E. Henry, Naperville, IL (US); Hans K. Fauske, Hinsdale, IL (US); Robert J. Hammersley, Oak Park, IL (US); James Farrington, Lockport, IL (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1232 days.

(21) Appl. No.: 11/968,708

(22) Filed: Jan. 3, 2008

(65) Prior Publication Data

US 2011/0214763 A1 Sep. 8, 2011

Related U.S. Application Data

(60) Provisional application No. 60/914,098, filed on Apr. 26, 2007.

(51) Int. Cl.
*B67C 11/02* (2006.01)
*B01D 29/07* (2006.01)
*E03C 1/181* (2006.01)

(52) U.S. Cl.
USPC ........ 137/545; 137/550; 137/561 A; 137/582; 141/339

(58) Field of Classification Search
USPC ............. 137/544, 545, 549, 550, 561 A, 590, 137/574, 582; 141/339; 210/456; 251/127; 405/40
See application file for complete search history.

(56) References Cited

U.S. PATENT DOCUMENTS

| | | | | |
|---|---|---|---|---|
| 2,286,207 | A * | 6/1942 | Keenan, Jr. et al. | 122/459 |
| 2,793,005 | A * | 5/1957 | Wagner et al. | 165/255 |
| 2,920,648 | A * | 1/1960 | Sheffer | 137/582 |
| 2,946,345 | A * | 7/1960 | Weltmer | 137/590 |
| 3,024,914 | A * | 3/1962 | Robson | 210/456 |
| 3,743,598 | A * | 7/1973 | Field | 210/709 |
| 5,341,523 | A | 8/1994 | Barnes | |
| 5,790,619 | A | 8/1998 | Peck | |
| 7,193,123 | B2 * | 3/2007 | Stell et al. | 585/652 |
| 2005/0023151 | A1 * | 2/2005 | Sandoval et al. | 205/574 |

* cited by examiner

*Primary Examiner* — Craig Schneider
*Assistant Examiner* — Atif Chaudry
(74) *Attorney, Agent, or Firm* — Joseph C. Spadacene; Westinghouse Electric Company LLC

(57) ABSTRACT

A vortex suppression device is provided which includes a plurality of spaced apart porous panels arranged generally parallel with respect to each other for placement adjacent a suction pipe inlet. The panels of the suppression device are oriented generally perpendicular to, or parallel to the suction pipe inlet. The device serves to prevent formation of a sufficiently strong vortex capable of pulling a continuous gas core into the suction piping.

16 Claims, 3 Drawing Sheets

CARTRIDGE TYPE VORTEX SUPPRESSION DEVICE

CLAIM TO PRIORITY

This application claims priority to U.S. provisional application No. 60/914,098 filed Apr. 26, 2007, entitled "Cartridge Type Vortex Suppression Device."

FIELD OF THE INVENTION

The present invention is directed to a device for suppressing vortices. More specifically, the present invention is directed to a modular device for suppressing vortices associated with the outlet from a tank or inlet to suction piping.

BACKGROUND OF THE INVENTION

While draining liquid from a tank or other similar enclosure, formation of a coriolis effect vortex or a vortex induced by the approach flow geometry is commonly encountered. The likelihood of such a vortex formation increases as the ratio of the height of the liquid above the drain compared to the diameter of the drain decreases. In other words, decreasing liquid levels and/or increasing drain sizes increase the likelihood of vortex formation. Another factor which can increase the likelihood of vortex formation is increasing drain flow rates, such as where a suction pump is connected to the drain to pull liquid from the enclosure.

Typical nuclear and chemical plants have numerous tanks which are commonly drained to levels in which the free surface between a gas and liquid can approach the drain level (discharge). Commonly, the discharge from such tanks is connected to suction pumps which expedite removal of the liquid from the tank. Experiments have shown that, under certain conditions, a vortex could be formed that permits gas from the freeboard space above the surface of the liquid to be pulled into the suction flow. Such a vortex is undesirable because it can limit the rate at which the liquid can be drained from the tank and can lead to cavitation in the suction (drain) pump. Accumulation of gas in a pump can result in a significant decrease in the pumping capacity and potentially damage the pump internals.

For tanks which have been designed to drain the liquid level to elevations that approach a depth where such a vortex could be formed, it is desirable to provide a device that prevents the formation of a sufficiently strong vortex capable of pulling a continuous gas core into the suction piping and pump.

It is also desirable to provide a device capable of being retrofit to existing tank outlets and suction piping inlets which may have limited accessibility.

It is also desirable that such a device be of reliable construction in both material and design for use in applications where harsh conditions and limited access provide for limited inspection and maintenance.

SUMMARY OF THE INVENTION

These needs and other are met by the embodiments of the invention, which provide a device of modular construction that prevents the formation of a sufficiently strong vortex capable of pulling a continuous gas core into the suction piping and pump. The modular construction allows for the device to be retrofit to existing tanks and piping where accessibility may be limited. Few necessary parts made from durable materials provide for a highly robust design particularly applicable to use in harsh conditions with limited maintenance. Additionally, the modular construction allows for the size of the device to be varied dependent on the needs of a specific application.

In accordance with an embodiment of the invention, a vortex suppression device is provided which includes a plurality of spaced apart porous panels arranged generally parallel with respect to each other adjacent a pipe inlet. The pipe inlet having an inlet opening lying generally in an inlet plane, with the panels of the suppression device oriented generally perpendicular to, or parallel to (depending on the inlet orientation) the inlet plane and secured relative to the pipe inlet by a frame structure.

In accordance with another embodiment of the invention, a vortex suppression device is provided which includes a plurality of spaced apart porous panels arranged generally parallel with respect to each other adjacent a pipe inlet. The pipe inlet having an inlet opening lying generally in an inlet plane, with the panels of the suppression device oriented generally perpendicular to, or parallel to, the inlet plane. The porous panels grouped together in pairs to form modules. The spacing between adjacent modules being generally equivalent to the spacing between porous panels within a module. Each module may be formed from a single sheet of perforated material or from multiple sheets of said material.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
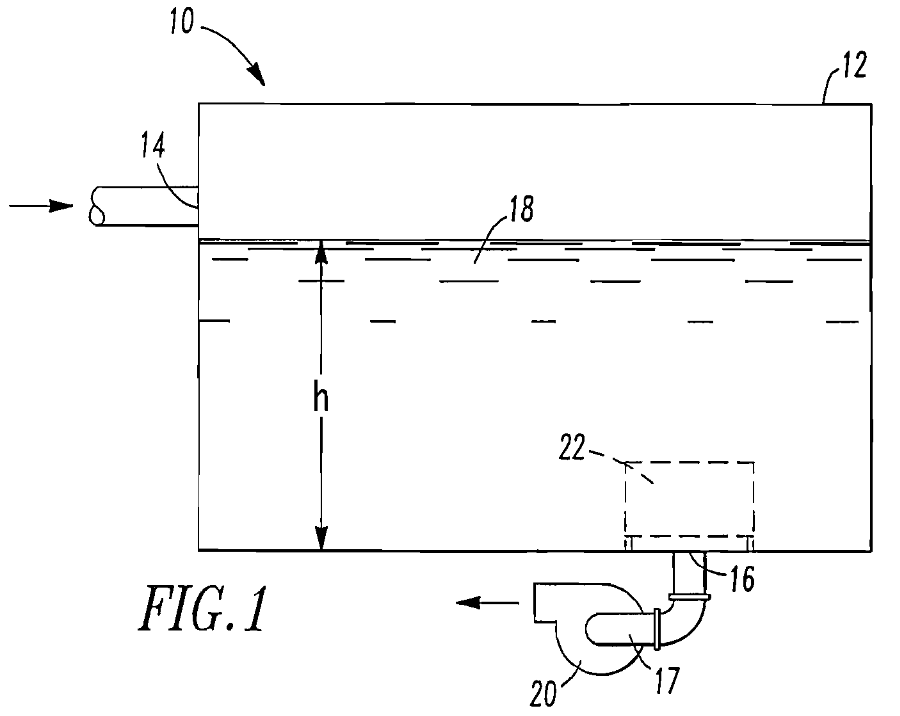
FIG. 1 shows a general view of a tank system which incorporates the present invention.

FIG. 1 illustrates an example tank system 10 incorporating an embodiment of the present invention. The system 10 consists of a tank 12 having an inlet 14 and an outlet 16. Details of the tank such as size, shape, number and positioning of inlet and outlet is shown for example purposes only and is not meant to limit the present invention. (For example, the outlet could be on the side wall of the tank.) The outlet 16 is commonly configured at or near a lower portion of the tank 12 to provide for complete or almost complete drainage of the tank if so desired through suction piping 17. As such, the tank outlet 16 could also be referred to as a suction piping inlet. The tank 12 contains a fluid 18 shown having a height h relative to the outlet 16. A suction pump 20, connected to the outlet 16 via suction piping 17, expedites removal of the fluid 18 from the tank 12. A vortex suppression device 22 is located generally near the outlet 16.

Figure 3:
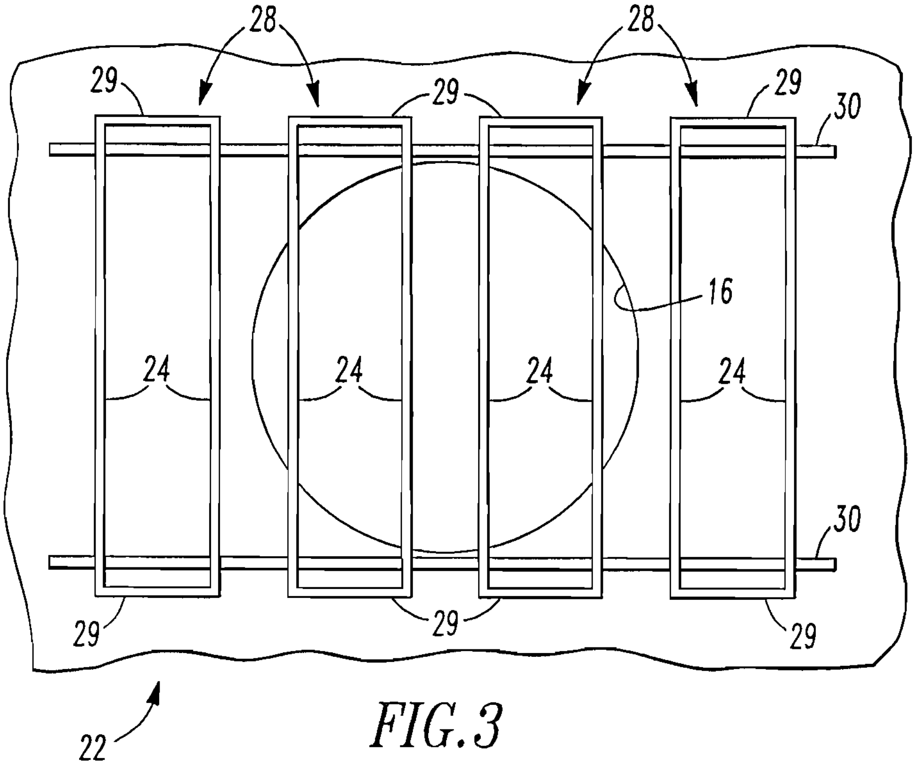
FIG. 3 shows a plan view of the vortex suppression device of FIG. 2
Figure 2:
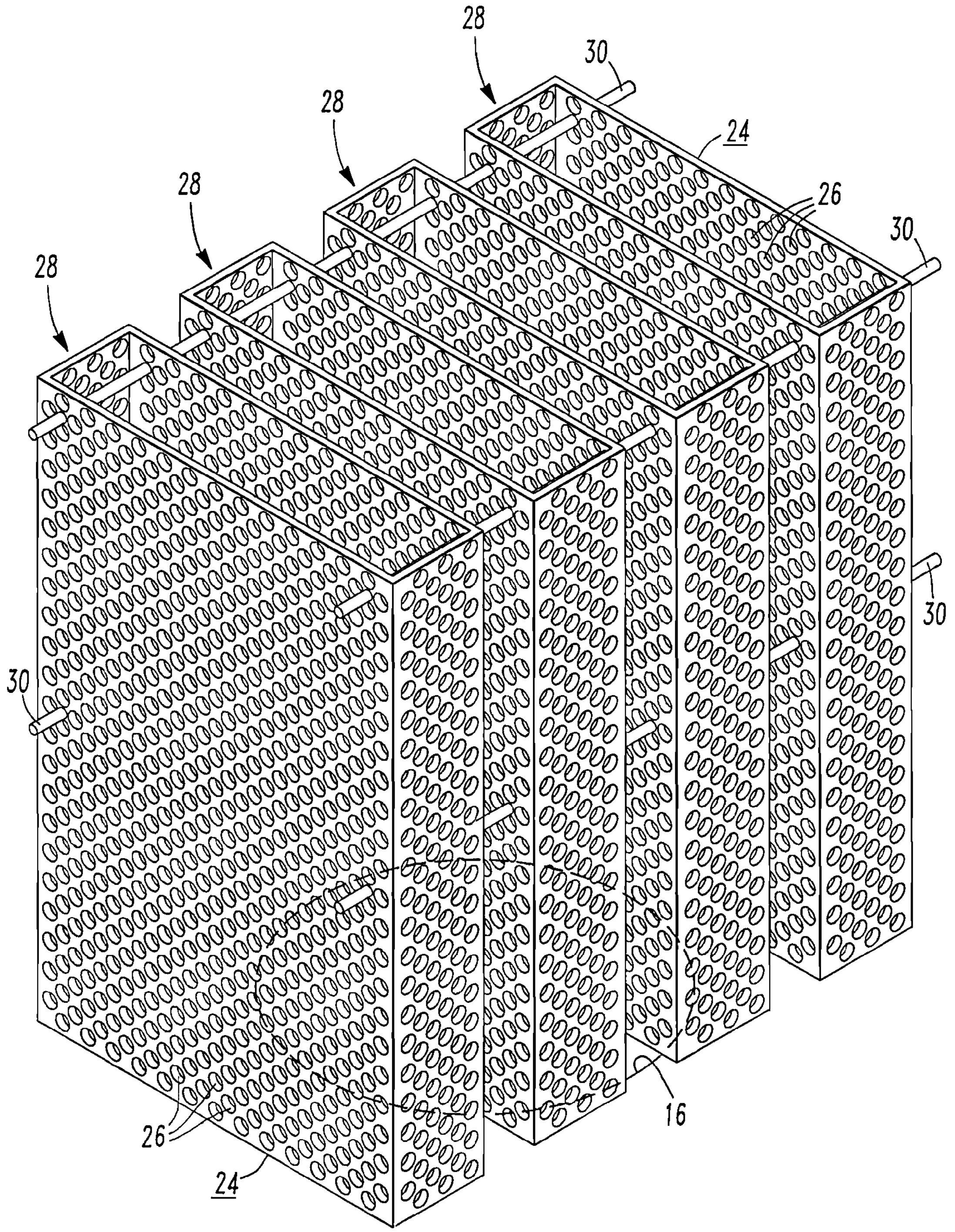
FIG. 2 shows an isometric view of a vortex suppression device in accordance with embodiments of the invention.

FIGS. 2 and 3 show detailed views of a preferred embodiment of the vortex suppression device 22 situated adjacent a tank outlet 16 (suction piping inlet). Device 22 includes a plurality of spaced apart panels 24 (best shown in FIG. 3), each panel 24 having a plurality of pores 26 (shown in FIG. 2). The panels 24 are grouped together in pairs to form modules 28.

In the preferred embodiment shown, each module 28 is formed from a single, or multiple sheets of perforated stainless steel material bent to form corners of the module 28 with the ends of the perforated sheet being joined by a single weld joint (not shown) to close the structure. Such a design is preferred due to ease of fabrication and durability due to reduced parts and weldments. It is noted that sidewalls 29 shown in the preferred embodiment of FIGS. 2 and 3 are a product of using a single sheet of material to form each module 28 and are not necessary for the present invention to function in suppressing vortices. An alternate embodiment using individual panels 24 held in the spatial relationship shown in the Figs. by rods 30 also has shown to successfully suppress vortex formation.

Modules 28 are secured relative to each other via a structural mounting frame, such as rods 30 as shown, and positioned at a relative height with respect to the outlet 16 via the structural frame. Typically, the vortex suppression device has an overall height that is at least 1.5 times the outlet diameter. It is noted that other structural elements commonly known to one skilled in the art could be employed to secure the panels 24 and modules 28 relative to each other and the outlet 16. As such, the use of rod 30 is shown as an exemplary mounting set-up only and not meant to limit the invention.

The use of modules 28 has been found to be advantageous over using separate panels 24 as individual panels tend to be flimsy and require added reinforcement. Conversely, the structure of module 28 adds rigidity to the two associated panels 24 and allows for the two separate panels 24 to be made from a single sheet of perforated material. The modular construction of the vortex suppression device 22 allows for such a device to be readily adapted to any suction flow rate or any size suction piping by adding additional modules as required to cover the diameter of the piping. Additionally, the modular construction allows for the device to be added to existing tanks with limited access. As best seen in FIG. 3, the spacing between the two separate modules 28 is preferably generally the same as the spacing between the two panels 24 associated with an individual module 28.

Preferably, the vortex suppression device 22 is fabricated from stainless steel and can be used in any environment including water, borated water, fuel oil, hydrocarbons, etc. It is foreseen that the suppression device 22 could also be fabricated from other materials or combination of materials, such as, but not limited to other metals, fiberglass (mesh or structural components) or the like.

When placed in a working environment, the vortex suppression device 22 is preferably centered over the tank outlet 16 (suction piping inlet) and sized such that device 22 covers the outlet 16 with a dimension that is at least twice the outlet diameter as best shown in the top view of FIG. 3. It is noted that the device 22 could be utilized in situations where centering over the outlet and/or sizing to cover the outlet are not possible or potentially desirable. While not producing optimum results, use of the device 22 in such a less than ideal manner could still produce favorable results versus not using the device 22.

In use, the porous grid structure of the panels 24 counter formation of large scale swirl flows by preventing their formation in the near vicinity of the entrance to the suction piping such as outlet 16. This is accomplished by the limited cross sectional flow area in the direction of the swirl (the holes in the porous panels) while only presenting a minimal resistance in the direction of flow toward the suction piping.

In a preferred embodiment, the porous panels 24 of an individual module 28 are designed to be approximately 1½ inches apart and the modules 28 are installed also approximately 1½ inches apart. With this dimension, the porous panels are involved in any surface circulation that would be the beginning of any large scale vortex. Consequently, the transverse flow resistance through the panels which have holes (for example ¼ inch in diameter) spaced sufficiently to give an open area of over 25%, is too large to enable the induced swirl flow to escalate into a full scale vortex that has the capability to develop a continuous gas core. Such a development is the manner in which large scale vortices can transmit the cover gas to the pump suction piping.

Figure 4:
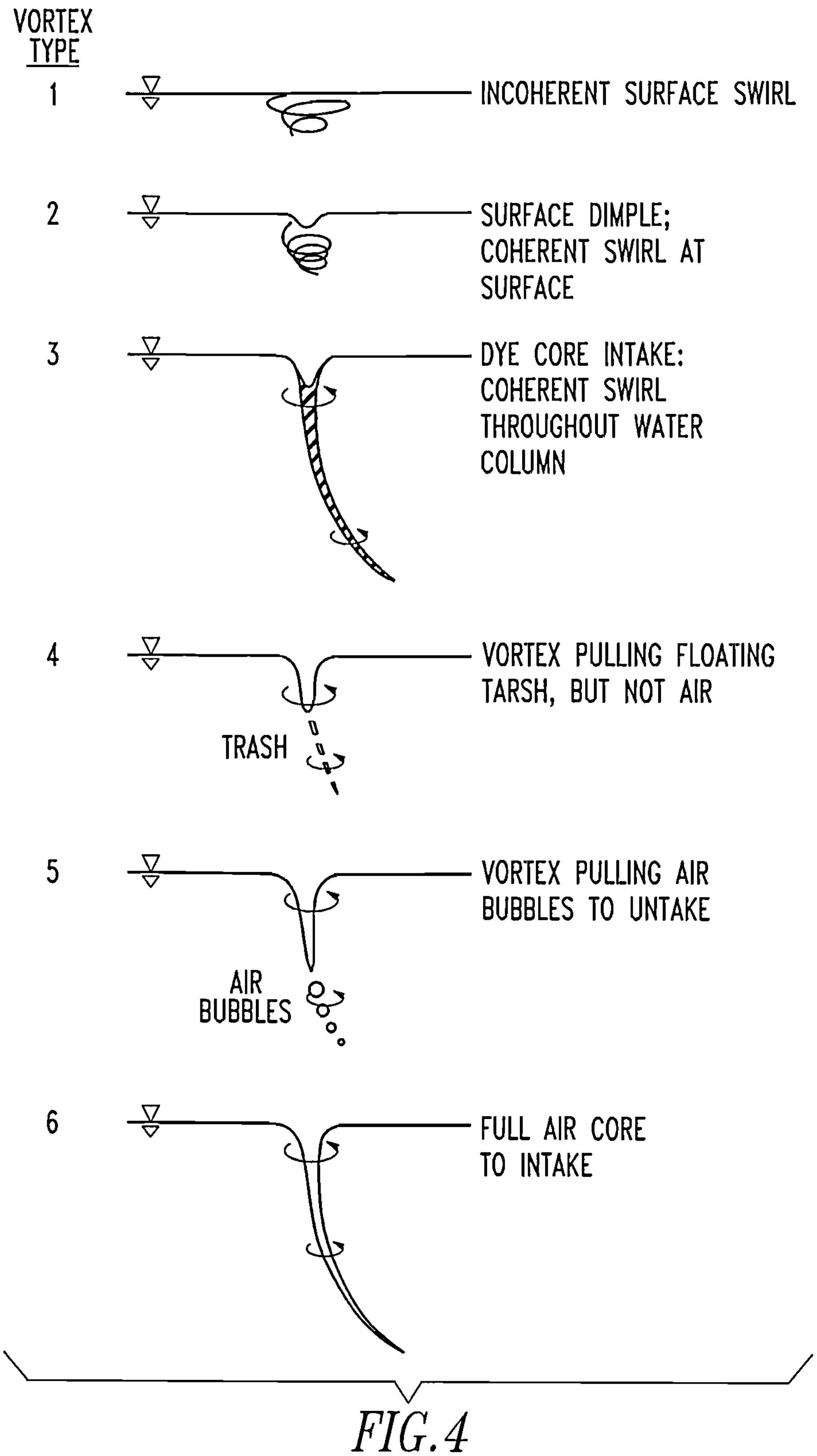
FIG. 4 is a chart showing different types of vortices and their classification on a numerical scale.

The characterization for various vortices is shown in FIG. 4. Of the various vortex types shown, only type 6 has the capability of transmitting sufficient quantities of gas to a pump to challenge the pumping performance of the pump. By using the vortex suppression device 22 described herein, the type 6 vortices are prevented from being induced by swirl flows near the entrance to the suction piping 17. The present design also limits the formation of vortices that are type 5 which further reduce the potential for air transport to the suction piping 17 and connected suction pump 20.

While specific embodiments of the invention have been described in detail, it will be appreciated by those skilled in the art that various modifications and alternatives to those detailed could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A vortex suppression device comprising:
- a plurality of spaced apart generally parallel panels, each panel having a plurality of pores formed therein and spaced vertically and horizontally within each panel, each panel being structured to be disposed adjacent a pipe inlet or outlet,
- wherein the pipe inlet or outlet is disposed generally in a plane,
- wherein each panel is structured to be oriented generally perpendicular to the plane, and
- wherein the plurality of spaced apart generally parallel panels comprises two spaced apart panels, each panel being a respective portion of a single, continuous sheet of a perforated material.

2. The vortex suppression device of claim 1, wherein at least one of the panels is structured to be disposed across the pipe inlet or outlet.

3. The vortex suppression device of claim 1, wherein the plurality of pores comprise a total area of at least 25% of the panel surface area.

4. The vortex suppression device of claim 1, wherein the perforated material is stainless steel, or another metal.

5. The vortex suppression device of claim 1, wherein each panel comprises a mesh fabricated of fiberglass.

6. A liquid handling system comprising:
- a vessel, at least partially enclosed, capable of holding a liquid;
- an outlet opening in the vessel from which a flow of the liquid may exit the vessel;
- a vortex suppression device in close proximity to the outlet comprising a plurality of spaced apart generally parallel panels, each panel having a plurality of pores formed therein and spaced vertically and horizontally within each panel,
- wherein at least one of the panels is disposed across the outlet opening.

7. The liquid handling system of claim 6, wherein the plurality of spaced apart generally parallel panels is structured together in pairs, each pair forming a module.

8. The liquid handling system of claim 7, wherein the spacing between panels of a module is generally equal to the spacing between modules.

9. The liquid handling system of claim 7, wherein the vortex suppression device is situated generally above the outlet opening and the modules extend beyond the perimeter of the outlet opening.

10. The liquid handing system of claim 6, wherein the vortex suppression device is rigidly secured via a mounting frame.

11. The liquid handling system of claim 10, wherein the vortex suppression device and mounting frame is constructed of a stainless steel material, or another metal.

12. The liquid handling system of claim 6 wherein the outlet opening is disposed generally in an outlet plane, and wherein each panel is disposed generally perpendicular to the outlet plane.

13. A method of suppressing a vortex in a liquid handling system comprising a vessel, at least partially enclosed, holding a liquid, the vessel having an outlet opening from which a flow of the liquid may exit the vessel, the method comprising:

securing a vortex suppression device to the vessel about the outlet opening, wherein the vortex suppression device comprises a plurality of spaced apart generally parallel porous panels, each panel having a plurality of pores formed therein and spaced vertically and horizontally within each panel, and wherein securing the vortex suppression device comprises securing the device such that an edge of at least one of the panels is disposed across the outlet opening.

14. The method of claim 13 wherein the outlet opening is disposed generally in a plane, and wherein securing the vortex suppression device further comprises securing each panel of the plurality of panels generally perpendicular to the plane of the outlet opening.

15. The method of claim 13 further comprising securing the plurality of spaced apart generally parallel porous panels of the vortex suppression device together in a spatial relationship via a structural mounting frame prior to securing the vortex suppression device to the vessel.

16. The method of claim 13 wherein the plurality of spaced apart generally parallel panels comprises two spaced apart panels, and wherein the method further comprises forming each panel from a respective portion of a single, continuous sheet of a perforated material by bending the continuous sheet in a manner such that a first portion of the continuous panel is disposed generally parallel to a second portion of the continuous panel.

* * * * *